(12) United States Patent
Pedersen et al.

(10) Patent No.: US 8,768,780 B2
(45) Date of Patent: *Jul. 1, 2014

(54) ELECTRONIC PRODUCT REGISTRATION SYSTEM WITH CUSTOMIZABLE RETURN/WARRANTY PROGRAMS

(71) Applicant: Nintendo of America Inc., Redmond, WA (US)

(72) Inventors: Jon Pedersen, Bothell, WA (US); Peter J. Junger, Redmond, WA (US)

(73) Assignee: Nintendo of America Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,657

(22) Filed: Jul. 12, 2013

(65) Prior Publication Data

US 2013/0304598 A1   Nov. 14, 2013

Related U.S. Application Data

(63) Continuation of application No. 10/100,157, filed on Mar. 19, 2002, now Pat. No. 8,510,171, which is a continuation-in-part of application No. 09/509,021, filed on Jul. 25, 2000, now Pat. No. 7,379,899.

(60) Provisional application No. 60/280,993, filed on Apr. 4, 2001.

(51) Int. Cl.
*G06Q 40/00* (2012.01)

(52) U.S. Cl.
USPC ............................................. 705/26.1

(58) Field of Classification Search
USPC ............................................. 705/26.1
See application file for complete search history.

(56) References Cited

U.S. PATENT DOCUMENTS

| | | | |
|---|---|---|---|
| 789,106 | A | 5/1905 | Seymour |
| 1,330,368 | A | 2/1920 | Boos |
| 1,393,489 | A | 10/1921 | Boos |
| 1,476,819 | A | 12/1923 | Hope |
| 4,312,037 | A | 1/1982 | Yamakita |
| 4,414,467 | A | 11/1983 | Gould et al. |
| 4,458,802 | A | 7/1984 | Maciver et al. |
| 4,563,739 | A | 1/1986 | Gerpheide et al. |
| 4,598,810 | A | 7/1986 | Shore et al. |
| 4,668,150 | A | 5/1987 | Blumberg |

(Continued)

FOREIGN PATENT DOCUMENTS

| | | |
|---|---|---|
| BR | PI 9813567-8 | 10/2000 |
| BR | 0101819-1 | 2/2003 |

(Continued)

OTHER PUBLICATIONS

Jan. 13, 2005 Blog (Message 14 of 17) about Schuman article "Bar-Code Scam at Wal-Mart: A Matter of Priorities".

(Continued)

*Primary Examiner* — Thomas M Hammond, III
(74) *Attorney, Agent, or Firm* — Nixon & Vanderhye, P.C.

(57) ABSTRACT

An electronic product registration (ER) system which enables a retailer, preferable in cooperation with its vendors, to provide a customized return/warranty program for customers on a product-by product basis. The original policy(ies) in the ER system can be modified for a particular product and the modified policy is stored in the ER system so that the modified policy can be accessed if the product is again presented for a return/warranty transaction.

18 Claims, 4 Drawing Sheets

(56) References Cited

U.S. PATENT DOCUMENTS

| | | |
|---|---|---|
| 4,734,005 A | 3/1988 | Blumberg |
| 4,750,119 A | 6/1988 | Cohen et al. |
| 4,789,054 A | 12/1988 | Shore et al. |
| 4,792,018 A | 12/1988 | Humble et al. |
| 4,803,348 A | 2/1989 | Lohrey et al. |
| 4,812,629 A | 3/1989 | O'Neil et al. |
| 4,814,592 A | 3/1989 | Bradt et al. |
| 4,839,505 A | 6/1989 | Bradt et al. |
| 4,858,743 A | 8/1989 | Paraskevakos et al. |
| 4,866,661 A | 9/1989 | De Prins |
| 4,871,054 A | 10/1989 | Murray |
| 4,884,212 A | 11/1989 | Stutsman |
| 4,893,705 A | 1/1990 | Brown |
| 4,896,024 A | 1/1990 | Morello et al. |
| 4,903,815 A | 2/1990 | Hirschfeld et al. |
| 4,967,906 A | 11/1990 | Morello et al. |
| 4,984,155 A | 1/1991 | Geier et al. |
| 4,997,076 A | 3/1991 | Hirschfeld et al. |
| 5,007,518 A | 4/1991 | Crooks et al. |
| 5,020,958 A | 6/1991 | Tuttobene |
| 5,028,766 A | 7/1991 | Shah |
| 5,042,686 A | 8/1991 | Stucki |
| 5,128,520 A | 7/1992 | Rando et al. |
| 5,128,527 A | 7/1992 | Kawai et al. |
| 5,133,441 A | 7/1992 | Brown |
| 5,139,384 A | 8/1992 | Tuttobene |
| 5,143,193 A | 9/1992 | Geraci |
| 5,159,560 A | 10/1992 | Newell et al. |
| 5,216,612 A | 6/1993 | Cornett et al. |
| 5,231,569 A | 7/1993 | Myatt et al. |
| 5,256,863 A | 10/1993 | Ferguson et al. |
| 5,257,741 A | 11/1993 | Rode et al. |
| 5,273,183 A | 12/1993 | Tuttobene |
| 5,311,424 A | 5/1994 | Mukherjee et al. |
| 5,367,148 A | 11/1994 | Storch et al. |
| 5,414,252 A | 5/1995 | Shinoda et al. |
| 5,478,990 A | 12/1995 | Montanari et al. |
| 5,520,990 A | 5/1996 | Rotermund |
| 5,521,815 A | 5/1996 | Rose, Jr. |
| 5,537,314 A | 7/1996 | Kanter |
| 5,541,394 A | 7/1996 | Kouchi et al. |
| 5,581,064 A | 12/1996 | Riley et al. |
| 5,602,377 A | 2/1997 | Beller et al. |
| 5,671,279 A | 9/1997 | Elgamal |
| 5,712,989 A | 1/1998 | Johnson et al. |
| 5,721,832 A | 2/1998 | Westrope et al. |
| 5,737,726 A | 4/1998 | Cameron et al. |
| 5,745,036 A | 4/1998 | Clare |
| 5,799,285 A | 8/1998 | Klingman |
| 5,804,803 A | 9/1998 | Cragun et al. |
| 5,857,175 A | 1/1999 | Day et al. |
| 5,890,138 A | 3/1999 | Godin |
| 5,895,453 A | 4/1999 | Cook |
| 5,913,210 A | 6/1999 | Call |
| 5,918,214 A | 6/1999 | Perkowski |
| 5,950,173 A | 9/1999 | Perkowski |
| 5,968,110 A | 10/1999 | Westrope et al. |
| 5,984,508 A | 11/1999 | Hurley |
| 6,014,635 A | 1/2000 | Harris et al. |
| 6,016,480 A | 1/2000 | Houvener et al. |
| 6,029,139 A | 2/2000 | Cunningham et al. |
| 6,029,141 A | 2/2000 | Bezos et al. |
| 6,039,244 A | 3/2000 | Finsterwald |
| 6,049,778 A | 4/2000 | Walker et al. |
| 6,055,511 A | 4/2000 | Luebbering et al. |
| 6,064,979 A | 5/2000 | Perkowski |
| 6,085,167 A | 7/2000 | Iguchi |
| 6,105,001 A | 8/2000 | Masi et al. |
| 6,115,690 A | 9/2000 | Wong |
| 6,119,099 A | 9/2000 | Walker et al. |
| 6,119,164 A | 9/2000 | Basche |
| 6,125,352 A | 9/2000 | Franklin et al. |
| 6,134,533 A | 10/2000 | Shell |
| 6,148,249 A | 11/2000 | Newman |
| 6,154,738 A | 11/2000 | Call |
| 6,219,652 B1 | 4/2001 | Carter et al. |
| 6,222,914 B1 | 4/2001 | McMullin |
| 6,536,659 B1 | 3/2003 | Hauser |
| 6,550,685 B1 | 4/2003 | Kindberg |
| 6,606,608 B1 | 8/2003 | Bezos |
| 6,746,053 B1 | 6/2004 | Afzali-Ardakani et al. |
| 6,834,268 B2 | 12/2004 | Junger |
| 6,933,848 B1 | 8/2005 | Stewart et al. |
| 6,947,941 B1 | 9/2005 | Koon |
| 6,965,866 B2 | 11/2005 | Klein |
| 6,974,941 B2 | 12/2005 | Kuo |
| 7,000,834 B2 | 2/2006 | Hind et al. |
| 7,117,227 B2 | 10/2006 | Call |
| 7,118,478 B2 | 10/2006 | Fayter et al. |
| 7,143,055 B1 | 11/2006 | Perkowski |
| 7,162,440 B2 | 1/2007 | Koons |
| 7,376,572 B2 | 5/2008 | Siegel |
| 7,379,899 B1 | 5/2008 | Junger |
| 7,415,617 B2 | 8/2008 | Ginter et al. |
| 7,455,230 B2 | 11/2008 | Junger et al. |
| 7,580,860 B2 | 8/2009 | Junger |
| 7,693,731 B1 | 4/2010 | Weber et al. |
| 7,729,923 B2 | 6/2010 | O'Connor |
| 7,797,164 B2 | 9/2010 | Junger et al. |
| 7,840,439 B2 | 11/2010 | O'Connor |
| 7,850,081 B2 | 12/2010 | Swan et al. |
| 7,890,373 B2 | 2/2011 | Junger |
| 2002/0032612 A1 | 3/2002 | Williams et al. |
| 2002/0116274 A1 | 8/2002 | Hind et al. |
| 2002/0133425 A1 | 9/2002 | Pederson et al. |
| 2002/0143671 A1 | 10/2002 | Afzali-Ardakani et al. |
| 2003/0050891 A1 | 3/2003 | Cohen |
| 2003/0094494 A1 | 5/2003 | Blanford et al. |
| 2003/0126034 A1 | 7/2003 | Cheney et al. |
| 2003/0141358 A1 | 7/2003 | Hudson et al. |
| 2004/0006514 A1 | 1/2004 | Rogers |
| 2004/0054900 A1 | 3/2004 | He |
| 2004/0153344 A1 | 8/2004 | Bui et al. |
| 2004/0172260 A1 | 9/2004 | Junger et al. |
| 2004/0195341 A1 | 10/2004 | Lapstun et al. |
| 2005/0097054 A1 | 5/2005 | Dillon |
| 2005/0100144 A1 | 5/2005 | O'Connor |
| 2005/0137882 A1 | 6/2005 | Cameron et al. |
| 2006/0175401 A1 | 8/2006 | Roberts |
| 2007/0100761 A1 | 5/2007 | Dillon |
| 2007/0185788 A1 | 8/2007 | Dillon |
| 2008/0008348 A1 | 1/2008 | Metois |
| 2008/0052184 A1 | 2/2008 | Junger et al. |
| 2008/0059226 A1 | 3/2008 | Melker |
| 2008/0262948 A1 | 10/2008 | Grady et al. |
| 2009/0150170 A1 | 6/2009 | Junger et al. |
| 2009/0281935 A1 | 11/2009 | Junger |
| 2010/0185533 A1 | 7/2010 | O'Connor |
| 2010/0235290 A1 | 9/2010 | Junger et al. |
| 2010/0257486 A1 | 10/2010 | Smith |
| 2010/0325020 A1 | 12/2010 | Junger et al. |
| 2011/0016008 A1 | 1/2011 | Maraz et al. |
| 2011/0029397 A1 | 2/2011 | Junger |
| 2011/0066514 A1 | 3/2011 | Maraz |

FOREIGN PATENT DOCUMENTS

| | | |
|---|---|---|
| BR | PI 0503016-1 | 10/2005 |
| BR | PI 0505846-5 | 9/2007 |
| CA | 2404814 | 9/2002 |
| CN | 1177408 | 3/1998 |
| CN | 1289972 | 4/2001 |
| CN | 101068731 | 11/2007 |
| CN | 101089871 | 12/2007 |
| DE | 3 315 724 | 10/1984 |
| EP | 0 068 642 | 1/1983 |
| EP | 0 191 636 | 8/1986 |
| EP | 0 286 130 | 10/1988 |
| EP | 0 349 284 | 1/1990 |
| EP | 0 845 749 | 6/1998 |
| EP | 0 862 154 | 9/1998 |
| EP | 1028386 | 8/2000 |
| EP | 1841195 | 11/2000 |
| EP | 1195704 | 4/2002 |

(56) References Cited

FOREIGN PATENT DOCUMENTS

| | | |
|---|---|---|
| EP | 1246109 | 10/2002 |
| EP | 1571541 | 3/2005 |
| EP | 1667018 | 10/2005 |
| EP | 2036015 | 12/2007 |
| FR | 2 559 599 | 8/1985 |
| GB | 2 143 662 | 2/1985 |
| GB | 2 203 879 | 10/1988 |
| GB | 2 209 157 | 5/1989 |
| GB | 2 209 158 | 5/1989 |
| GT | 200000127 | 10/2000 |
| GT | 200000061 | 11/2000 |
| GT | 200300100 | 3/2006 |
| GT | 200200141 | 7/2007 |
| IN | 1072/CHENP/2003 | 7/2005 |
| IN | 1763/CHENP/2003 | 3/2007 |
| IN | 2137/CHENP/2005 | 7/2007 |
| IN | 538/MUM/2008 | 4/2008 |
| IN | 8258/DELNP/2007 | 4/2008 |
| IN | 8266/DELNP/2007 | 7/2008 |
| IN | 303/KOLNP/2008 | 12/2008 |
| IN | 53/KOL/2008 | 4/2009 |
| IN | 1421/KOLPN/2009 | 6/2009 |
| JP | 02-139698 | 5/1990 |
| JP | 04-347793 | 12/1992 |
| JP | 405178422 A | 7/1993 |
| JP | 405342482 A | 12/1993 |
| JP | 08-124033 | 5/1996 |
| JP | 10-340301 | 12/1998 |
| JP | 11-143954 | 5/1999 |
| JP | 2000-123078 | 4/2000 |
| JP | 2002-279090 | 9/2002 |
| JP | 2002-133080 | 10/2002 |
| JP | 2003-316871 | 11/2003 |
| JP | 2005-141374 | 6/2005 |
| JP | 2005-234981 | 9/2005 |
| JP | 2007-226516 | 9/2007 |
| JP | 2007-257561 | 10/2007 |
| JP | 2008-197768 | 8/2008 |
| JP | 2009-032171 | 2/2009 |
| MX | 218248 | 3/1998 |
| MX | PA/a/2000/002497 | 3/1999 |
| MX | 221246 | 7/1999 |
| MX | PA/a/2002/000636 | 11/2001 |
| MX | MX/a/2007/014520 | 11/2006 |
| WO | 87/00948 | 2/1987 |
| WO | 88/02524 | 4/1988 |
| WO | 88/06771 | 9/1988 |
| WO | 89/09460 | 10/1989 |
| WO | 92/01273 | 1/1992 |
| WO | 99/33016 | 7/1999 |

OTHER PUBLICATIONS

Jan. 6, 2005 Blog (Message 4 of 17) about Schuman article "Bar-Code Scam at Wal-Mart: A Matter of Priorities".
Deposition of Peter J. Junger, vol. 1 & 2 (Nov. 8-9, 2001) and Exhibits 1-4 & 8-19.
Deposition of Philip M. Rogers (Nov. 7, 2001) and Exhibits 1-19.
Emigh, Jacqueline, "Item-Level RFID Is Years Away for Retailers", eWeek, Jan. 5, 2005.
Heller, "High cost of returns prompts industry cooperation," Discount Store News, Oct. 1998, 3 pages.
Hughes Network Systems, LLC, "HughesNet Terms & Conditions", http://www.nationwidesatellite.com/HughesNet/service/HughesNet_terms.asp, available online Sep. 2, 2008.
Information Disclosure Statement filed in U.S. Appl. No. 09/362,187, on Oct. 26, 2001.
Information Disclosure Statement filed in U.S. Appl. No. 09/494,540, on Jan. 31, 2000.
Information Disclosure Statement filed in U.S. Appl. No. 09/809,072, on Oct. 26, 2001.
Return Parts Policy, Aug. 5, 2003, www.foxmacon.com, online, pp. 1-3.
Scala, Betsy Video Business, "Distributors seek 30-day returns", v 15, n 39, p l+ Oct. 6, 1995.
Scala, Betsy Video Business, "Distributors seek 30-day returns", v 13, n 3, p l+ Jan. 22, 1993.
Schuman, Evan, "Bar-Code Scam at Wal-Mart: A Matter of Priorities", eWeek, Jan. 5, 2005.
Schuman, Evan, "Wal-Mart Stung in $1.5 Million Bar-Code Scam", eWeek, Jan. 5, 2005.
Information Disclosure Statement filed in U.S. Appl. No. 09/509,021, on Oct. 26, 2001.
Information Disclosure Statement filed in U.S. Appl. No. 09/065,552, on Jul. 19, 1999.
Information Disclosure Statement filed in U.S. Appl. No. 08/725,259, on Oct. 5, 1998.
Nintendo Point of Purchase Mail-In Card.
1994 Nintendo Product Returns Policies and Procedures.
1995 Nintendo Product Returns Policies and Procedures.
1996 Nintendo Product Returns Policies and Procedures.
1992 Nintendo Product Returns Policy.
John Longwell, "Robec Links Its 18 Sales Facilities Via Newly Adopted NetWare System", Computer Reseller News, Sep. 6, 1993.
Leyden, "Burgled mum finds stolen iPod on eBay," The Register, May 17, 2005, 1 page.
"Man accused in Lego selling scam," http://www.kptv.com/Global/story.asp?S=4137050&nav=munil56_2, Nov. 18, 2005, 1 page.
Grace, "Reseller Profile—Reynolds and Reynolds; Reynolds goes extra mile—Evolving solutions continue to fuel clients' capabilities", Computer Reseller News, CMP Publications, Inc., Feb. 21, 1994, 2 pages.
PR Newswire, "CompuServe Introduces Electronic Product Registration Software", PR Newswire Association, Inc., Mar. 10, 1994, 2 pages.
Longwell, "Western Digital Wins—Price/performance gives driver maker victory margin", Computer Reseller News, CMP Publications, Inc., Jun. 28, 1993, 3 pages.
Grace, "ABCD Looks to Adopt EDI Transaction Sets", Computer Reseller News, CMP Publications, Inc., Jun. 28, 1993, 2 pages.
Discount Store News, "New Policy System can Par Suspect Returns, Cut Losses", Discount Store News, Lebhar-Friedman Inc., Jan. 1, 1996, 2 pages.
Synchronics® User Manual: Point of Sale, Version 6.5, Apr. 1993 (ON 004464-ON 005116).
Synchronics® User Manual: Inventory Plus, Version 6.5, Apr. 1993 (ON 005117-ON 005892).
Collins, David Jarrett and Nancy Nasuti Whipple, Using Bar Code: Why It's Taking Over, Second Edition (ON 003696-ON 004031).
Birnbaum, Henry, General Information Manual: IBM Circulation Control at Brooklyn College Library, 29pp. (ON 001822-ON 001850.
White, Howard S., Library Technology Reports, Mar.-Apr. 1982, vol. 18, No. 2, pp. 178-184 (ON 001851-ON 001858).
Cooper, Michael D., Design of Library Automation Systems, pp. 83-109 (ON 1859-ON 001873).
Corbin, John, Developing Computer-Based Library Systems, pp. 144-149 (ON 001874-ON 001877).
DataPhase, Inc. Automated Circulation System, 43 pp. (ON 001878-ON 001904).
Dranov, Paula, Automated Library Circulation Systems, 1977-78, pp. 24-47 (ON 001905-ON 001929).
Hoadley, Irene Braden and A. Robert Thorson, An Automated On-Line Circulation System: Evaluation, Development, Use, 1973, 19 pp. (ON 001930-ON 001948).
Meyer, James, "NOTIS: The System and Its Features", Library Hi Tech, Issue 10, vol. 3, No. 2, 1985, pp. 81-89 (ON 001949-ON 001959).
Dowlin, Kenneth E., "MAGGIE III: The Prototypical Library System", Library Hi Tech, Issue 16, vol. 4, No. 4, Winter 1986, pp. 7-15 (ON 001960-ON 001970).
Matthews, Joseph R., "Graphical User Interfaces GUI in Library Products", Library Technology Reports, vol. 32, No. 1, Jan. 1996, p. 53 (ON 001972-ON 001976).

(56) References Cited

OTHER PUBLICATIONS

Saffady, William, "Integrated Library Systems for Microcomputers and Mainframes: A Vendor Study", Library Techology Reports, vol. 30, No. 1, Jan. 1994, p. 5 (ON 001977-ON 002087).
Saffady, William, "Vendors of Integrated Library Systems for Minicomputers and Mainframes: An Industry Report, part 1", Library Techology Reports, vol. 33, No. 2, Mar. 1997, p. 161 (ON 002088-ON 002096).
Saffady, William, "Vendors of Integrated Library Systems for Microcomputers and Mainframes: An Industry Report, part 2", Library Techology Reports, vol. 33, No. 3, May 1997, p. 277 (ON 002097-ON 002138).
Salton, Gerard, Dynamic Information and Library Processing, pp. 62-69 (ON 002139-ON 002143).
Grosch, Audrey N., Distributed Computing and the Electronic Library: Micros to Superminis, pp. 78-79 (ON 002144-ON 002146).
Reynolds, Dennis, Library Automation: Issues and Applications, pp. 42-49 and pp. 146-149 (ON 002147-ON 002153).
Salmon, Stephen R., Library Automation Systems, p. 239 (ON 002154-ON 002155).
Synchronics Software Product Information guide, 95 pages.
Direct Return 2000, Software Overview, http://www.directreturn.com/software_overview.htm, Copyright © 2000 Pharmacy Software Solutions, Inc.
"Retailing in Cyberspace", Narda News, Apr. 1995, pp. 21-22.
PR Newswire, "Escada Offers a Garden Variety for Spring", PR Newswire Association, Inc., Mar. 10, 1994, 2 pages.
Automotive News, "Reynolds, ADP differ on superhighway progress", Crain Communications, Inc., Apr. 11, 1994, 3 pages.
Computer Reseller News, "Case Study; Tapping the Channel's 'Best in Class'", CMP Publications, Inc., Jan. 30, 1995, 2 pages.
Rigney, "User Migrates to Windows NT", InternetWeek, CMP Publications, Inc., Jan. 10, 1994, 2 pages.
Business Wire, "Multimillion-dollar Health-care Products", Business Wire, Inc., Dec. 15, 1993, 2 pages.
Margulis, "Reclaim: an efficient way to handle damaged products", U.S. Distribution Journal, BMT Publications Inc., Mar. 15, 1992, 7 pages.
Jiji Press Ticker Service, "MITI Working Out Business Practice Guidelines", JiJi Press Ltd., Apr. 20, 1990, 1 page.
Jiji Press Ticker Service, "JCCI Issues Booklet to Explain Distribution", JiJi Press Ltd., Jul. 20, 1989, 1 page.
Business Wire, "Aztech Labs Inc. is Chosen as Business Depot's 'Vendor of the Year'; Canadian Company Honors Multimedia Hardware Manufacturer as Number One in Computer Category", Business Wire, Inc., May 6, 1996, 2 pages.
LaPlante, "Rugby Darby; From proprietary host to a distributed LAN-based architecture in 2 years", InfoWorld, InfoWorld Media Group, Nov. 15, 1993, 4 pages.
Witt et al., "Distribution: a differentiator in 2000", Material Handling Engineering, Penton Publishing Inc., Oct. 1995, 15 pages.
Grotta, "Return to vendor: the right way to make mail-order returns", PC Sources, Information Access Company, a Thomson Corporation Company, ASAP Coastal Associates Publishing L.P., Feb. 1992, 10 pages.
Consumer Electronics, Warren Publishing, Inc., Consumer Electronics Personals, vol. 35, No. 6, p. 18.
Business Wire, "DataTrend receives award from AT&T Global Information Solutions", Business Wire, Inc., Nov. 7, 1995, 2 pages.
Quinn, "Why Wang took the third-party route", Information Access Company, a Thomson Corporation Company, ASAP Reed Publishing USA, vol. 30, No. 2, p. 30, Feb. 1991.
Rogers et al., "Going Backwards: Reverse Logistics Trends and Practices", Reverse Logistics Executive Council, 1998 (entire book).
IBM Systems Journal, vol. 14, No. 1, 1975, pp. 1-101.
CollegeTermPapers web page printout, "History of Fed Ex", www.collegetermpaper...rmPapers/Aviation/history_of_fed_ex.html (Aug. 24, 2001), 7 pages.
Rosenbloom, "Midnight Express", Inc., Jul. 2001, 4 pages.
Sleeper, "FedEx Pushes the Right Buttons to Remain No. 1 in Fast Shipping", Investor's Business Daily, May 25, 2001, 2 pages.
Brewin et al., "Follow That Package!", Computer World, vol. 35, No. 12, Mar. 19, 2001, 4 pages.
Joachim, "FedEx Delivers on CEO's IT Vision", InternetWeek, Oct. 25, 1999, 4 pages.
Federal Express Information Packet, 56 pages (incl. cover and table of contents).
Sigafoos et al., "Absolutely Positively Overnight!: The Unofficial Corporate History of Federal Express", St. Luke Press, 1988, pp. 1-22.
Witt, "How to Master the Art of Returns: Automation Is the Key", Material Handling Engineering, Jun. 1994, pp. 58-60.
Dilger, "The Other Direction", Manufacturing Systems, vol. 15, No. 10, pp. 12-13 (Oct. 1997).
"Computer City Moves to Consolidate Returns", Computer Retail Systems, vol. 6, No. 125, Jan. 22, 1998, 2 pages.
Dreamcom web page printout, www.dreamcomdirect.com/RMA.htm (May 25, 1997).

ELECTRONIC PRODUCT REGISTRATION SYSTEM WITH CUSTOMIZABLE RETURN/WARRANTY PROGRAMS

CROSS-REFERENCE TO RELATED APPLICATIONS

This application is a continuation of application Ser. No. 10/100,157 filed Mar. 19, 2002, which claims the benefit of Provisional Application No. 60/280,993 filed Apr. 4, 2001, and is a continuation-in-part of Ser. No. 09/509,021 filed Jul. 25, 2000, the entire contents of each of which are hereby incorporated by reference in this application.

FIELD OF THE INVENTION

The instant invention relates to the field of electronic registration (ER) of purchased products, and more particularly, to an improved electronic registration system which enables a retailer, preferable in cooperation with its vendors, to provide a customized return/warranty program for customers on a product-by product basis and as the need arises. The system enables, for example, an existing return and/or warranty policy that has expired to be extended for the customer in the ER system in response to a return request while a customer is in a retail location. The system also enables flexibility for the retailer to extend the date(s) on which a vendor will accept a return from the retailer and still provide the desired credit to the retailer.

BACKGROUND AND SUMMARY OF THE INVENTION

Recently, electronic registration (ER) of product transactions has become available for the purpose of reducing unauthorized returns of purchased products and/or unauthorized warranty repair on purchased products. Electronic product registrations systems provided for this purpose are disclosed in, for example, U.S. Pat. Nos. 5,978,774, 6,018,719 and 6,085,172, the disclosures of which are all incorporated by reference herein in their entirety. The electronic registration system relies on the use of a unique identifier, such as a serial number, for each product that is purchased. The serial number is obtained at the point of sale for inclusion in a registration database, together with other information, such as a date of transaction. This database can then be accessed in connection with an attempted product return/warranty transaction for the purpose of determining if the product qualifies for return/warranty under applicable return/warranty criteria under which the product was originally sold. Such electronic systems may also be used in connection with repair and/or exchange transactions, in addition to returns, by enabling an accurate determination as to whether the product qualifies for any of these actions under the appropriate policies and criteria under which the product was originally sold.

The ER system uses pre-established return/repair policies and procedures that are programmed into the ER system so that the system can perform a check when a product is presented for return to determine if the product qualifies for return, replacement and/or warranty repair based on sales transaction information available in the ER system for the particular product at issue. Thus, known ER systems include a database of return qualification information (or warranty/replacement criteria) for various manufacturer's which enables the system to make an accurate determination with respect to whether or not a product actually qualifies for return (or warranty/replacement) based on the appropriate criteria and at the time the product is actually presented for return. Such ER systems have greatly reduced improper and fraudulent returns and warranty claims.

While such ER systems have proven to be very useful in their current forms, additional improvements in the system are still desired to make such ER systems more flexible in operation in order to benefit customers, retailers and manufacturers. The instant invention provides an improved ER system that has increased flexibility with respect to the particular terms of the return/warranty period or qualification on a product-by-product basis. In accordance with a preferred embodiment of the invention, the return/warranty qualification information can be customized by the retailer while a customer is at the retailer's facility, or after an agreement has been reached with the customer and the retailer regarding such as change.

As an added feature to ER, this invention allows a retailer, in cooperation with it's vendors, to facilitate a customized return/warranty program while the customer is in the retailer's store (or upon reaching an agreement with the customer regarding such as change). The invention is implemented through software which enables an authorized user of the ER system (such as a store manager) to enter a customized return/warranty program for a particular customer or group of customers that will later be used by the ER system as part of the return qualification information when making a decision as to whether the product qualifies for return/warranty. In other words, the invention enables the store manager or other authorized individual to override or modify the original return qualification information to reflect a modified or customized return/warranty program on a case-by-case basis. The modified or updated return/warranty program is then stored in the ER system for later reference if the product is again returned by the customer for return or warranty.

The invention provides the retailer with the flexibility it may need or desire to satisfy the needs of its customer(s) in certain situations that may warrant a change in the original return/warranty terms existing in the ER system. This customizable return/warranty program feature of the instant invention can also be used to ensure that all products returned to the store within the store's return policy (e.g., 90-days) receive appropriate credit from the vendor. In other words, this customizable feature works for both the customer, retailer and manufacturer by enabling the original terms to be modified appropriately for certain situations that may arise and for which the original terms may not be considered appropriate at a later time for some reason.

The invention further enables store managers to make reasonable exceptions beyond the 90-day or other return/warranty period that they may have, and still receive credit from the vendor with the vendor being in agreement with the change. In other words, the system preferably enables changes to made within predefined limits or guidelines that the retailer and/or manufacturer agree to in advance, so that the changes are available if needed and are pre-approved for use in certain circumstances that may warrant such a change. For example, the invention enables reasonable extensions or changes to be made to the original return/warranty terms based on a situation that the retailer is presented with that may justify such a change in order to meet objectives of the store with respect to customer relations or business objectives. The system also enables the store manager (or other authorized person) to authorize and/or extend repair warranties. Time periods can also be extended for returns back to the manufacturer (e.g., from 150 days to 180 days), to assure that the retailer gets appropriate credit for such returns from the manufacturer.

In accordance with the invention, store managers (or associates) are empowered to authorize and extend repair warranties beyond the original "factory" repair warranty date. This is preferably done with the vendor's cooperation and permission. One benefit of extending a "repair" warranty in the store over taking a product back is that usually there is nothing wrong with products that are being returned. In fact, statistics show that 60-90% of returned products are not defective. Thus, often times the consumer falsely claims that the product is defective and indicates that he would like a refund. However, many times the retailer does not want to alienate the customer or challenge his claim. Thus, by offering a "free" warranty repair for a product for which the original factory warranty already has expired, the retailer unarms the consumer, refuses a return in the nicest way, and because there is often nothing wrong with the product the vendor typically does not incur an expense for the warranty extension. As a result, the retailer and vendor's returns can drop significantly at no or very little additional expense. Also, for those honest consumers who really do have a defective product, the vendor typically wants to accommodate them anyway, and this invention provides convenient flexibility to enable such accommodation.

As will be explained in greater detail below, the invention provides a mechanism that can be used in conjunction with existing ER systems to accommodate customers having a variety of different situations in a manner that typically will satisfy the customer and without causing any additional or significant costs to the vendor or retailer. In this way, the ER system enables the retailer to maintain good relations with all of its customers in a controlled and relatively easy and effective manner, while still enjoying all of the benefits of electronic product registration.

BRIEF DESCRIPTION OF THE DRAWINGS

Other objects, features, advantages and characteristics of the present invention will become apparent from the following detailed description of the exemplary embodiments, when read in conjunction with the accompanying drawings, in which.

DETAILED DESCRIPTION OF PREFERRED EMBODIMENTS

The present invention is described in the context of particular exemplary embodiments. However, it will be recognized by those of ordinary skill that modification, extensions and changes to the disclosed exemplary embodiments may be made without departing from the scope of the instant invention. In short, the following descriptions are provided by way of example only, and the present invention is not limited to the particular preferred embodiments disclosed herein, except as indicated in the pending claims.

Figure 1:
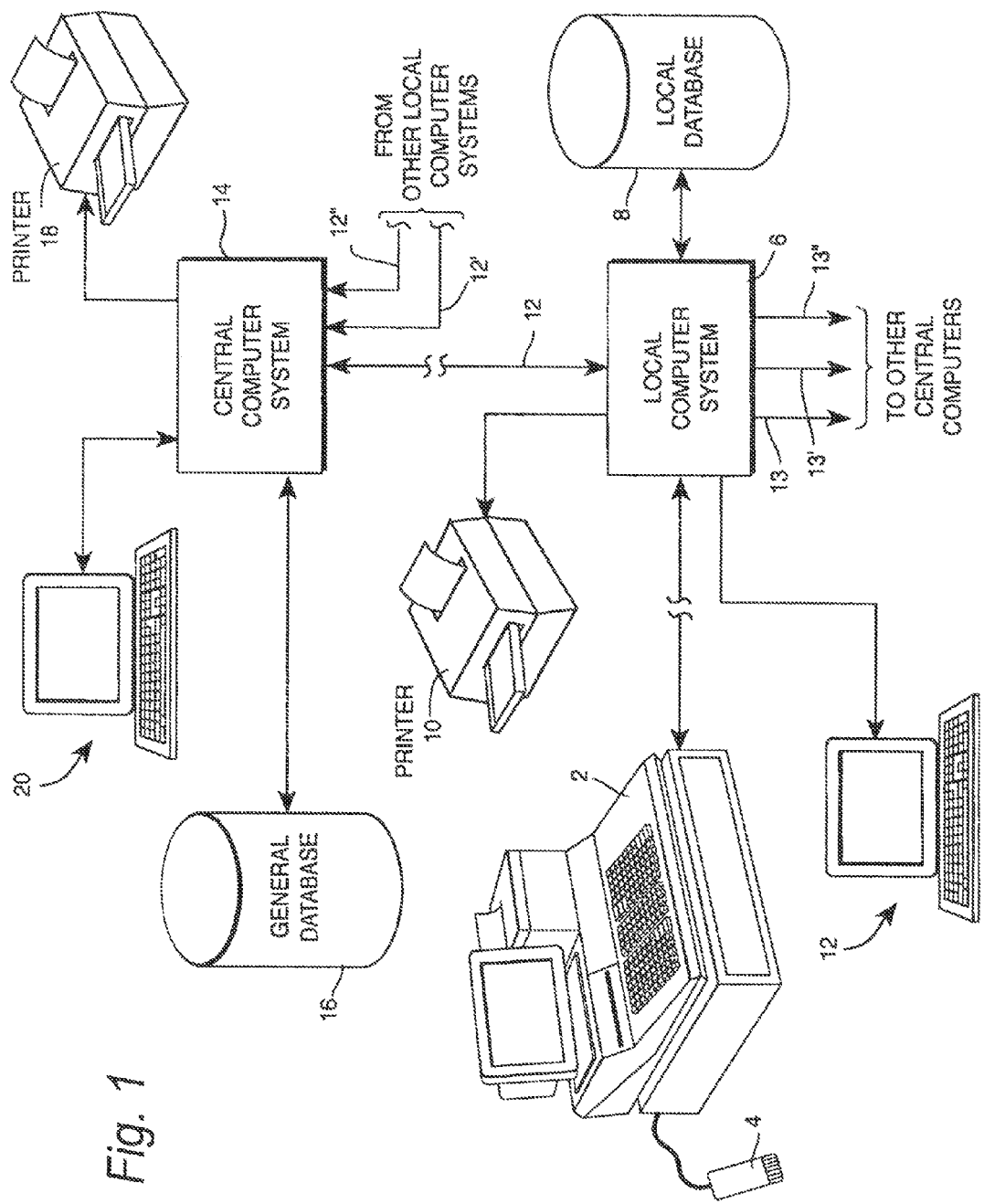
FIG. 1 is a schematic block diagram illustrating an example of an overall electronic product registration (ER) system that may be used in accordance with the present invention.

An example of one type of electronic product registration (ER) system that is preferably used in connection with the instant invention is illustrated in FIG. 1. Briefly, this example system includes a point of sale register 2 and an associated bar code scanner 4. The register 2 is preferably connected with a local computer system 6 in any suitable manner. In certain situations (e.g., single store retailers), it may be advantageous to have the local computer system 6 located in proximity to the register 2. For large chain stores, however, it may be advantageous to situate the local retailer computer 6 at a central location with links to the registers 2 at individual stores. The particular arrangement will depend on the preferences and circumstances of the specific retailer and may vary in accordance therewith.

The local retailer computer system includes an associated local database 8 for storing registration information. Additionally, a local printer 10 and an operator terminal 11 may be provided. The operator terminal may be used, for example, by a store clerk upon return of merchandise to locate pertinent sales information in the local database 8. The printer 10 may be used to produce hard copies of, for example, end-of-day sales reports and/or the like.

In the exemplary embodiment, a communication channel 12 is provided between the retailer computer system 6 and a central computer system 14. The central registration computer system may, for example, be an independent registration center computer system which electronically registers product transactions for a number of different retailers. In other words, the central computer system may be operated by a third-party service provider.

A general registration database 16 is associated with the central registration computer system 14 for storing transaction information from a plurality of retailer computer systems 6. Additionally, a printer 18 and an operator terminal 20 may be included with the central registration computer system 14. As discussed below in greater detail, the central registration computer system may maintain a number of data files pertaining to individual retailers, manufactures and the like. These data files include information applicable to the particular individual retailer, distributor, manufacturer or the like and are preferably maintained by that particular individual or entity. For example, a data file may contain specific return/warranty policy information applicable to that particular individual or entity.

It should be appreciated that the central computer system 14 is preferably intended to handle product registrations for a number of different manufacturers and/or other vendors. Accordingly, the general registration database may employ a structure wherein the product registrations for each participating vendor is maintained in separate areas. Alternatively, separate databases may be employed for each participating vendor. Of course, other data structures may be employed so long as the registration center is able to properly keep track of the product transaction information and particular return and/or warranty policies associated with each transaction.

As illustrated in FIG. 1, the central registration computer system 14 may have a number of additional communications links 12', 12", etc. for receiving information from other local computer systems. Thus, for example, a registration center may receive information from a number of different retailers. Additionally, the local computer system 6 may include a number of additional communication channels 13, 13', 13", etc. for connecting with other central computer systems. Accordingly, an individual retailer can electronically register products with a number of different registration databases, if desired. Furthermore, a number of communication channels 15, 15', 15", etc. can be provided for communications between the central registration computer system 14 and individual manufacturer computer systems and computer systems of third party service providers, law enforcement agencies and/or the like. Of course, a general access channel such as an internet connection may also be made available for authorized access to the central computer system 14.

The electronic registration process begins when a customer brings merchandise to the register 2 for check-out. The sales clerk enters the SKU number which identifies the type of product involved in the transaction (e.g., Super Nintendo Entertainment System, Nintendo Game Boy, Nintendo N64, etc.) by, for example, scanning a UPC product code included on the product packaging. Of course, key entry or another technique for entering the SKU number may be used. Electronic registration might not be necessary for a substantial number of small commodity products (e.g., batteries, candy, diapers, etc.) that are commonly sold by retailers. Accordingly, a check may be made, based on the type of product as identified by the UPC code, to determine whether this is a product for which electronic registration is desired. If so, the store associate is prompted to enter the serial number of the individual item.

The serial number may be entered, for example, by scanning a serial number printed on the packaging. Alternatively, the serial number as it appears on the product may be scanned through a window in the packaging. This alternative ensures that the individual product is identified even if it is mispackaged. Also, repackaging of returned merchandise would be simplified. Other techniques, such as key entry, may also be used. Because the serial number is unique to each individual product, it acts as individual production identification information.

Once the serial number is entered, a check may be made to ensure that the serial number is valid. If not, the store associate is again prompted to enter the serial number. This is repeated until a valid serial number is obtained. Once the serial number is verified, a local database may be updated with the serial number information and any other necessary or desired information. At minimum, however, the local database should include an indication of the date on which the transaction took place. Other information might include the price paid, the store associate responsible for the sale, and the like.

The serial number of the individual product is preferable printed as part of a written customer transaction receipt. The serial number may be printed adjacent the description and SKU number of the registered product. Thus, it will be a simple matter to correlate serial numbers with associated products, particularly when several registered products appear on a single customer sales receipt. Of course, additional information may be printed as well.

The date of the transaction will typically be printed at either the beginning or the end of the sales receipt, but may appear anywhere on the receipt. After the serial number is printed, a check is made to determine whether sales are complete. Ordinarily, this will be based on the store associate hitting a TOTAL button on the cash register. Thereafter, the central registration computer system 14 is contacted and the general registration database 16 is updated with the transaction information.

Inasmuch as ER systems are known, further specific details regarding ER systems themselves will not be provided herein except as needed for a complete understanding of the invention. As seen from the above description of an ER system, original policies are defined for products when the are first sent to the retailer by the vendor. The ER system preferably includes the policies of both the vendor and the retailer and enables the policies of both parties to be easily and conveniently enforced.

Figure 2:
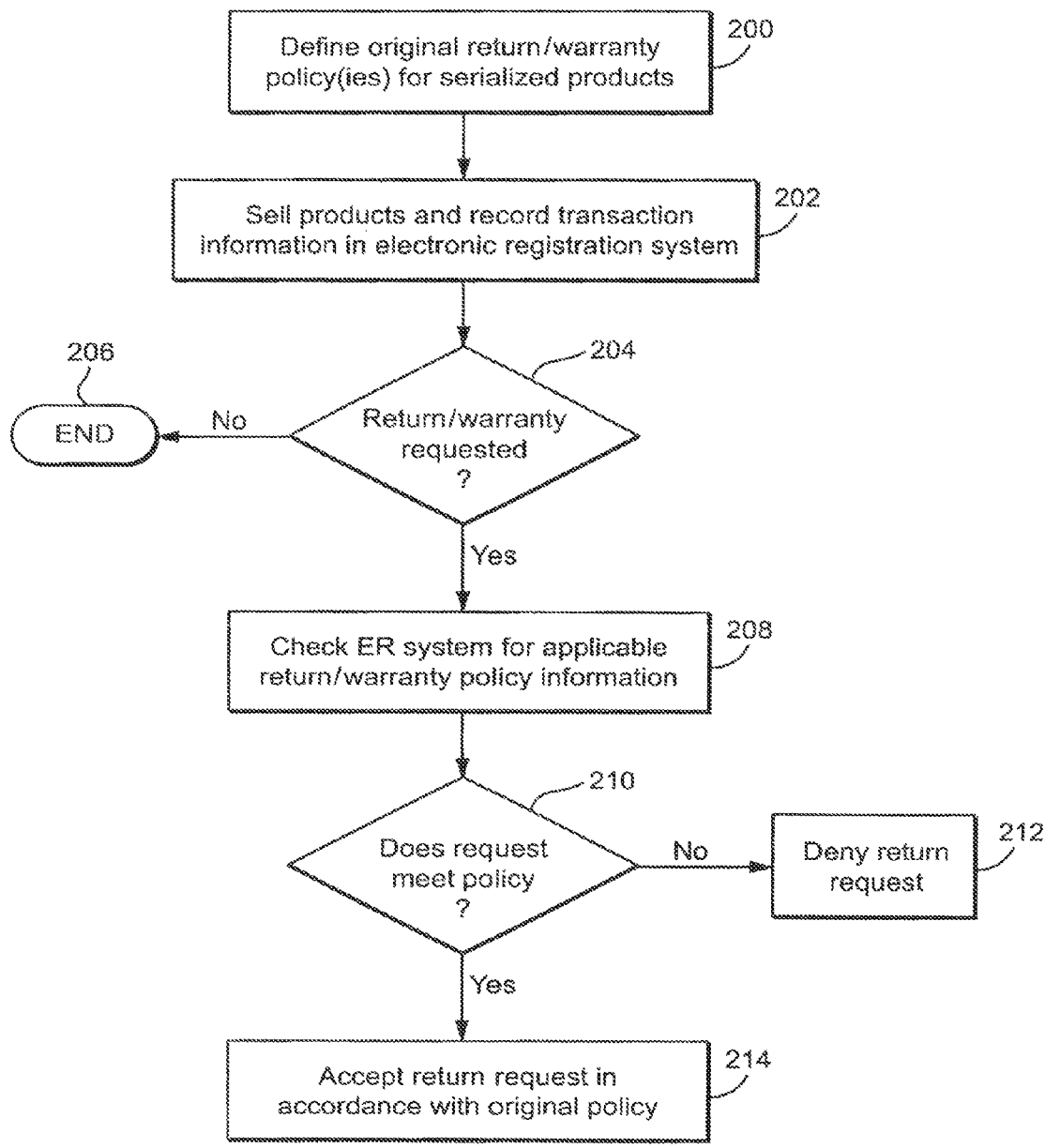
FIG. 2 is a high level flow chart of some of the main steps performed in accordance with prior electronic product registration (ER) systems.

FIG. 2 shows the main steps performed in connection with conventional ER systems. As shown in FIG. 2, the return/warranty policy(ies) are defined for serialized products and entered into the ER system (step 200). The ER system uses the policies and the sales transaction information, as well as the date on which a return is requested, to determine if the product qualifies for return when presented for return. Thus, when the products are sold, the sales transaction is recorded in the ER database (step 202). If the consumer is satisfied with the product, then the process ends (step 206). On the other hand, if a return is requested (step 204), the ER system is accessed to obtain the return qualification information for the specific product being presented for return (step 208). In accordance with conventional ER systems, the return request is handled based on the return qualification information provided by the ER system based on the original policies under which the product was originally sold. Thus, based on the return qualification information provided by the ER system, a determination is made as to whether or not the product qualifies for return/warranty repair or the like (step 210). If the product does qualify for the action requested, the request can be honored by the retailer and the transaction can be completed (step 214). On the other hand, if the ER system indicates that the product does not qualify for the requested action, the customer is typically denied the return or warranty repair (step 212). Of course, the store clerk could decide, for some reason, to ignore the ER information and accept the product anyway. There is, however, no mechanism in conventional ER systems to enable the policy to be modified or customized in the ER system by the retailer if such a modification is desired due to special circumstances that warrant such a modification.

The instant invention provides an improved ER system that enables customized policies to be introduced to the ER system by the retailer (or other authorized party) on a case-by-case and product-by-product basis. The invention greatly increases the flexibility of ER systems to handle special circumstances that may and often will arise in a retail setting.

Figure 3:
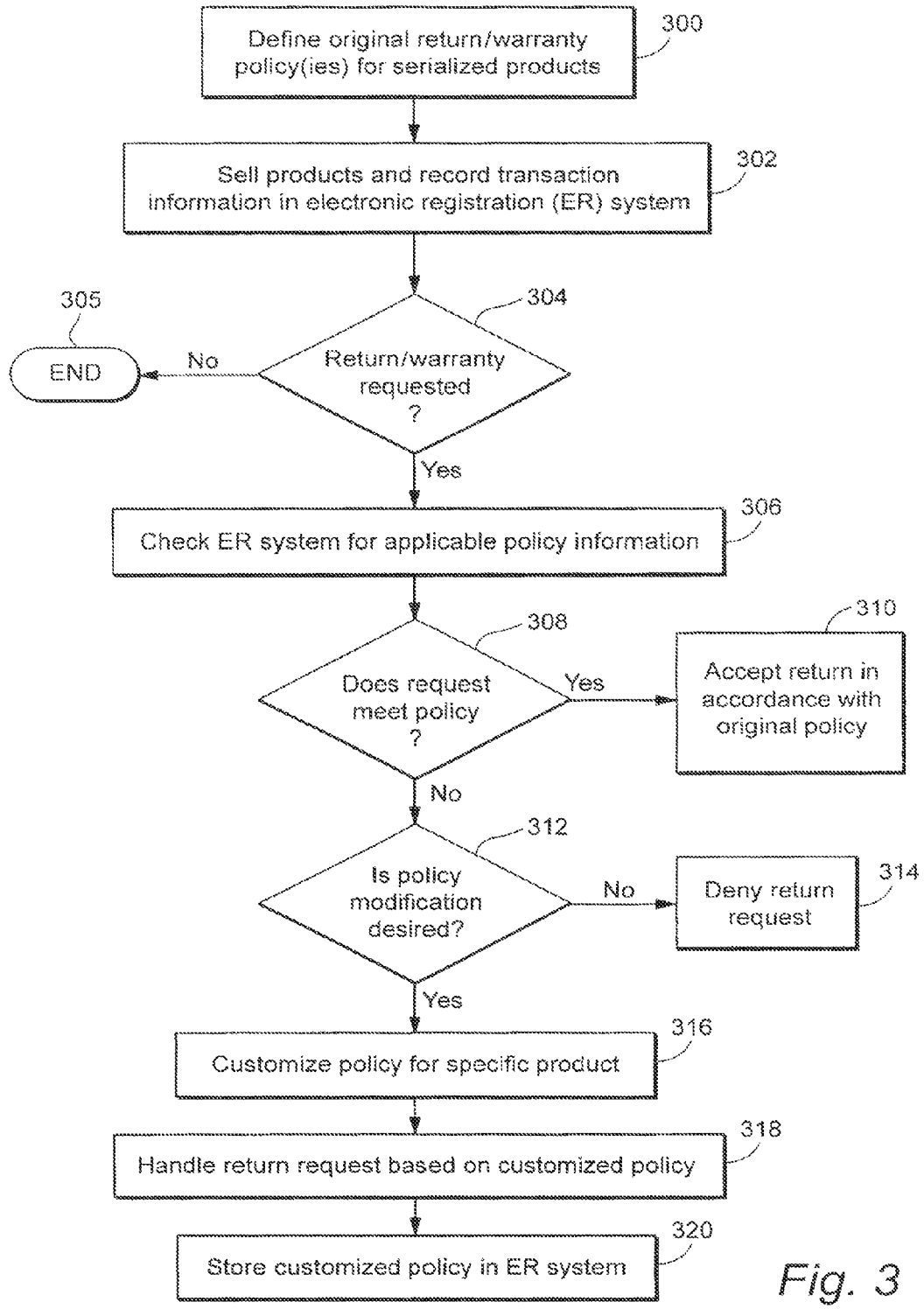
FIG. 3 is a high level flow chart of the main steps performed in accordance with the preferred embodiment of the customizable ER system of the instant invention.

FIG. 3 shows the main steps involved in practicing the improved ER system of the instant invention. As shown in FIG. 3, the first step (step 300) involves defining original return/warranty policies for serialized products that will be offered for sale and registered in the ER system. These policies may be vendor and/or retailer policies, or any other policies that are to be associated with the products in the ER system. The original policies are programmed into the ER system so that the ER system can associate the appropriate policy to the appropriate serialized product when the product is sold and the sale is registered in the ER system. The next step (step 302) involves selling the serialized products and registering the sale transaction in the ER database. Once sold, if the purchaser is satisfied with the product and does not attempt to return the product the process ends for that product (step 305). On the other hand, if the customer returns to the retailer and requests a return or warranty transaction (step 304), the ER system is checked for the applicable return/warranty policy(ies) under which the product was originally sold. In other words, the original policy information is accessed by the ER system and that information is used in conjunction with the date on which the product is returned to make a determination (step 308) as to whether or not that particular product qualifies for the transaction being requested by the customer. If the requested transaction does qualify under the original policy, then the return/warranty transaction is approved and is accepted from the customer (step 310). On the other hand, if the requested transaction does not qualify under the original return policies, a determination can be made, based on the particular circumstances presented, whether or not the retailer desires to modify or customize the original policy to satisfy the customer's request (step 312). If a policy modification is not desired, the requested transaction is denied (step 314).

On the other hand, if an authorized store associate of the like determines that a modification of the existing policy is appropriate, the ER system enables the associate to modify the policy in the ER system so that the customer's request can be satisfied in some way. The modification is preferably enables by presenting a screen that is accessed by an appropriate password that shows the original policy and enables the associate to enter modification(s) to the original policy to generate a customized policy of the customer (step 316). Preferably, the ER system is programmed to only enable modifications within predefined guidelines, thereby preventing abuse of this feature. Also, the ER system preferably generates reports on a periodic basis that detail the modifications so that checks can be performed to prevent abuses.

Once the policy(ies) have been modified in the ER system, the store associate handles the requested transaction in accordance with the modified policy (step 318). In accordance with the invention, the customized policy is stored in the ER system for the particular product involved in the return/warranty transaction (step 320). In this way, the customized policy is available from the ER system if and when the product is again brought to a retailer for another return/warranty transaction. Thus, the invention allows the customized policy to be defined in the ER system for a particular product.

Figure 4:
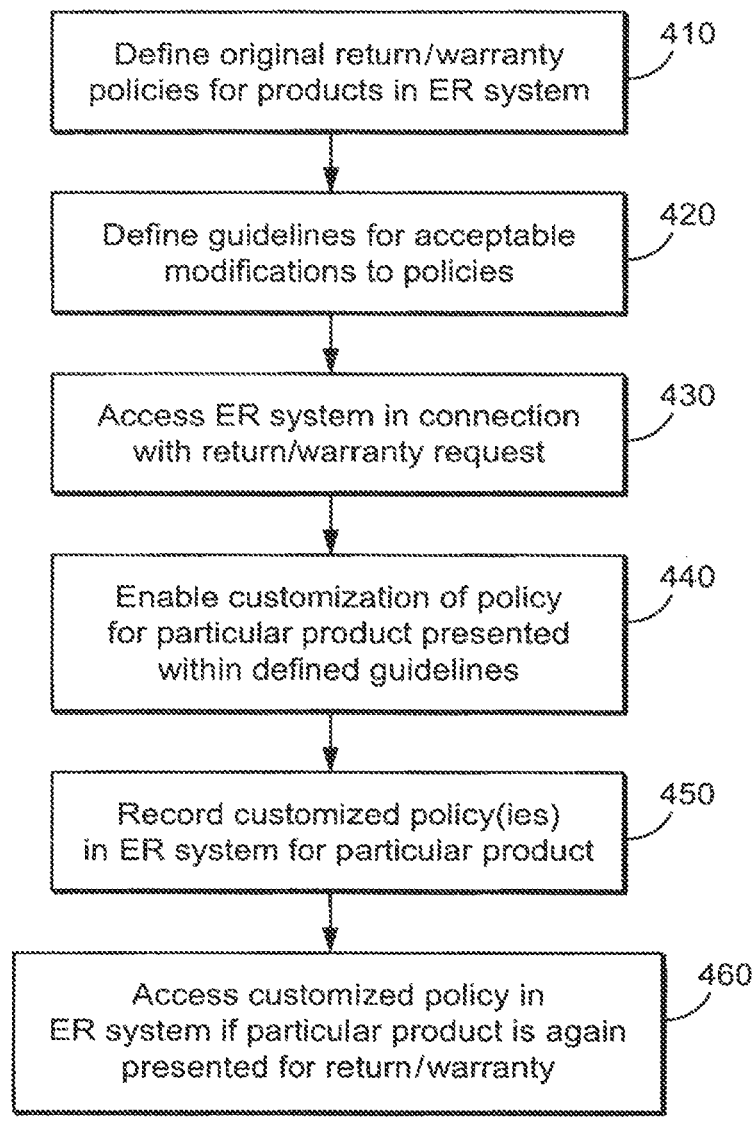
FIG. 4 is a high level flow chart illustrating some of the main steps performed in connection with the policy customization feature of the instant invention.

In accordance with another aspect of the invention, the modifications to the original policy(ies) are preferably done within pre-defined guidelines that are set by the vendor and/or retailer. This feature is illustrated in FIG. 4. As shown in FIG. 4, once the original policies are defined for the serialized products (step 410), guidelines are defined for acceptable modifications to the policies (step 420). Thus, the original policies and the guidelines are preferably entered in the ER system so that they are both available when the system is accessed in connection with a return/warranty transaction (step 430). The guidelines are preferably agreed to by the vendor and the retailer and are designed to give the retailer certain flexibility for certain situations that the parties anticipate may arise in connection with the products. Thus, an authorized person can then customize the policy for a particular customer/product within the defined guidelines (step 440). The customized policy is then stored in the ER system for future access in case the product is again presented for a return/warranty transaction (step 460).

As can be seen from the above description, the invention provides a mechanism that can be used in conjunction with existing ER systems to accommodate customers having a variety of different situations in a manner that typically will satisfy the customer and without causing any additional or significant costs to the vendor or retailer. In this way, the ER system enables the retailer to maintain good relations with all of its customers in a controlled and relatively easy and effective manner, while still enjoying all of the benefits of electronic product registration. This customizable return/warranty program feature of the instant invention can also be used to ensure that all products returned to the store within the store's return policy (e.g., 90-days) receive appropriate credit from the vendor. This is achieved by enabling an authorized person to modify the vendor's policy with predefined guidelines so that the return will be accepted by the vendor from the retailer and so that the retailer can get the appropriate credit from the vendor. In other words, this customizable feature works for the customer, retailer and manufacturer by enabling the original terms to be modified appropriately for certain situations that may arise and for which the original terms may not be considered appropriate at a later time for some reason.

What is claimed is:

1. An electronic product registration system operable to help implement a customizable return program, comprising:
   a computer processor;
   a storage medium tangibly storing a plurality of policies, including an original return policy defined for a set of serialized products in the electronic product registration system;
   where the computer processor is programmed to at least:
      receive, via a communication channel, a first serialized product of the set of serialized products presented for a first return request, the first serialized product having a first unique identifier associated with the predefined original return policy;
      verify the first unique identifier and determine that the first serialized product does not qualify for return under the predefined original return policy or any other predefined return policy;
      define a customized return policy for the first serialized product, the customized return policy being different from the original return policy and reflecting a planned course of action for the received first serialized product;
      provide first instructions concerning how to handle the first return request based on the customized return policy;
      store, in the storage medium, the customized return policy by overriding the predefined original return policy to create and store a modified return policy, wherein the modified return policy acts as a predefined return policy for future returns of other serialized products in the set of serialized products;
      receive, over the communication channel, a second serialized product of the set of serialized products presented for a second return request, the second serialized product having a second unique identifier associated with the predefined original return policy;
      access the modified return policy upon receiving the second return request; and
      provide second instructions concerning how to handle the second return request based on the modified return policy.

2. The system of claim 1, wherein either the original return policy or the customized return policy allows returns for products purchased within 90 days.

3. The system of claim 1, wherein a plurality of original return policies is defined for the serialized products.

4. The system of claim 3, wherein the plurality of policies include vendor and retailer policies.

5. The system of claim 1, wherein the computer processor is further configured to enable customization of the original return policy in accordance with preapproved modifications.

6. The system of claim 5, wherein the preapproved modifications are defined by both the retailer and the vendor.

7. The system of claim 5, wherein the computer processor is further configured to make the preapproved modifications available to a user through the electronic product registration system.

8. The system of claim 1, wherein the computer processor is further configured to require an authorized person to define the customized return policy in the electronic product registration system.

9. The system of claim 1, wherein:
the original return policy includes at least one original return policy term,
the customized return policy includes at least one customized return policy term, and
at least one said customized return policy term is inconsistent with at least one said original return policy term.

10. An electronic product registration system operable to help implement a customizable warranty program, comprising:
a computer processor;
a storage medium tangibly storing a plurality of policies, including an original warranty policy defined for a set of serialized products in the electronic product registration system;
where the computer processor is programmed to at least:
receive, via a communication channel, a first serialized product of the set of serialized products presented for a first warranty request, the first serialized product having a first unique identifier associated with the predefined original warranty policy;
verify the first unique identifier and determine that the first serialized product does not qualify for warranty under the predefined original warranty policy or any other predefined warranty policy;
define a customized warranty policy for the first serialized product, the customized warranty policy being different from the original warranty policy and reflecting a planned course of action for the received first serialized product;
provide first instructions concerning how to handle the first warranty request based on the customized warranty policy;
store, in the storage medium, the customized warranty policy by overriding the predefined original warranty policy to create and store a modified warranty policy, wherein the modified warranty policy acts as a predefined warranty policy for future warranty requests of other serialized products in the set of serialized products;
receive, over the communication channel, a second serialized product of the set of serialized products presented for a second warranty request, the second serialized product having a second unique identifier associated with the predefined original warranty policy;
access the modified warranty policy upon receiving the second warranty request; and
provide second instructions concerning how to handle the second warranty request based on the modified warranty policy.

11. The system of claim 10, wherein either the original warranty policy or the customized warranty policy allows warranty service for products purchased within 90 days.

12. The system of claim 10, wherein a plurality of original warranty policies is defined for the serialized products.

13. The system of claim 12, wherein the plurality of policies include vendor and retailer policies.

14. The system of claim 10, wherein the computer processor is further configured to enable customization of the original warranty policy in accordance with preapproved modifications.

15. The system of claim 14, wherein the preapproved modifications are defined by both the retailer and the vendor.

16. The system of claim 14, wherein the computer processor is further configured to make the preapproved modifications available to a user through the electronic product registration system.

17. The system of claim 10, wherein the computer processor is further configured to require an authorized person to define the customized warranty policy in the electronic product registration system.

18. The system of claim 10, wherein:
the original warranty policy includes at least one original warranty policy term,
the customized warranty policy includes at least one customized warranty policy term, and
at least one said customized warranty policy term is inconsistent with at least one said original warranty policy term.

* * * * *